United States Patent Office 3,748,184
Patented July 24, 1973

3,748,184
PROCESS OF PREPARING MANGANESE OXIDE
CATALYZED CATHODES
Romeo R. Witherspoon, Utica, Mich., assignor to General
Motors Corporation, Detroit, Mich.
Filed Nov. 26, 1971, Ser. No. 202,412
Int. Cl. H01m 13/04
U.S. Cl. 136—122                                  7 Claims

ABSTRACT OF THE DISCLOSURE

Method of rendering the active layer of an alkaline-electrolyte, oxygen-depolarized cathode catalytically active with a low cost manganese oxide catalyst. The cathode is capable of operating at high current densities without an appreciable buildup of hydrogen peroxide in the electrolyte. The cathode materials are treated with an alcohol-solvated manganous carboxylate solution in the presence of oxygen and a weak non-metal-containing alkalizer thereby forming manganic oxide having particle sizes mostly less than 0.2 microns in diameter. The active layer materials and solution are subsequently heated to drive off the solvent and any non-manganese oxide reaction products. An inexpensively catalyzed cathode with a low cathodic polarization at high current densities results.

BACKGROUND OF THE INVENTION

This invention relates to oxygen depolarized cathodes for alkaline-electrolyte galvanic cells, such as $H_2$—$O_2$ fuel cells or metal- air (i.e. Zn-air) cells. Such cathodes are generally of the controlled-wetting or hydrophobic type having a conductive support member and an active layer in which hydrophobic wetproofants, such as plastics (e.g., polyethylene, polypropylene, polystyrene, polyvinyl chloride and/or Teflon) and the naturally occurring waxes, are variously dispersed throughout conductive carbon or graphite particles, such as the carbon and acetylene blacks, activated carbon or the like. Wetproofants may be incorporated into an electrode either by intimate mixing with carbon or graphite prior to forming the electrode or by subsequently impregnating an already formed electrode structure.

The fabrication of one such cathode involves admixing hydrophobic particles with carbon or graphite particles and sintering the mixture. The hydrophobic particles may vary from as little as about 5% by weight to as much as about 75% by weight. In one version of this type of cathode, a conductive support and current collector (e.g., nickel screen or the like) is impregnated with polytetrafluoroethylene-bonded carbon or graphite. A thin film of hydrophobic agent is formed on the gas side of the impregnated collector. Cathodes of this type can be prepared by providing a layer of a first admixture of hydrophobic polytetrafluoroethylene particles (e.g. 0.01–0.90 microns) and carbon or graphite particles (e.g. 10–100 m.$^2$/g.) on a first thin aluminum foil. A thin film of all polytetrafluoroethylene particles is formed on a second foil. Next, a layer comprising a second admixture similar to the first admixture, is provided atop the all polytetrafluoroethylene film. A conductive screen (e.g., Pt, Ag, Ni, Au, etc.) is placed between the admixture layers and the entire assembly hot-pressed (350° C.) at 500 to 4,000 lbs./in.$^2$. The aluminum foils are then removed, as by dissolving in sodium hydroxide. The electrodes thusly formed are porous (i.e., 40%–60%) and vary in thicknesses from about 0.012 cm. to about 0.050 cm., with the polytetrafluoroethylene film accounting for about 0.005 to 0.025 cm. of the overall thickness.

In another version of a controlled wetting or hydrophobic type cathode, a porous metal sheet (e.g., nickel) is sprayed, or otherwise coated, with a hydrophobic polymer, such as polytetrafluoroethylene, and dried at about 100° C. The sheet is next coated with an admixture of particles containing about 50% polytetrafluoroethylene and 50% unactive carbon, dried at about 100° C. and then sintered for about 3 hours at 400° C. in an inert nitrogen atmosphere. It is next sprayed with polyethylene dissolved in toluene and dried. The polyethylene is less hydrophobic than the polytetrafluoroethylene. A number of additional layers comprising various admixtures of polyethylene and active carbon (i.e., 5–20 microns), with progressively decreasing polyethylene content, are sprayed onto the polyethylene film. In one specific case, for example, the first polyethylene-active carbon layer contains about 20% polyethylene, a second layer about 10% polyethylene and a last layer about 5% polyethylene. By active carbon is meant one which has been catalyzed, as by coating with an electrocatalyst which, in the case of this invention, would be finely divided (i.e., less than 0.2 microns) manganese oxide. The electrode is next hot-pressed (i.e., 130°–140° C.) at about 1,000 lbs./in.$^2$ to sinter the several layers. The several polyethylene-carbon layers comprise about 0.01 cm.–0.05 cm. of the total thickness which can vary from about 0.02 cm. to about 0.10 cm. The surface containing the least hydrophobic material (i.e., 5% polyethylene) contacts the electrolyte while the polytetrafluoroethylene surface contacts the gas (e.g., oxygen).

Manganese oxide catalysts for the decomposition of hydrogen peroxide have been known for sometime, but have had limited utility in high power oxygen-depolarized cells of the alkaline electrolyte type since they were unable to produce current densities in excess of about 30 milliamps per square centimeter (ma./cm.$^2$), and had a tendency to allow a substantial buildup of cathode polarizing peroxides in the alkaline electrolyte. These deficiencies apparently result from the comparatively massive manganese oxide particles used heretofore in such electrodes. In these earlier electrodes, manganese dioxide or manganese carbonate particles were either physically admixed with the other materials in the active layer (e.g. carbon) or absorbed into the active layer of a finished electrode. When manganese carbonate was used, it was subsequently converted to the oxide by heat. In either case, however, the manganese oxide particle size was quite large and, where it was derived from another compound (e.g., manganese carbonate), the particle size of the manganese donor compound controlled the particle size of the oxide derivative.

THIS INVENTION

It is the principal object of this invention to provide a process for forming ultrafine (i.e. less than about 0.2 microns) particles of manganese oxide among the active materials of oxygen (including air) depolarized hydrophobic type cathodes. Other objects and advantages will become apparent from the more detailed discussion which follows.

Figure 1:
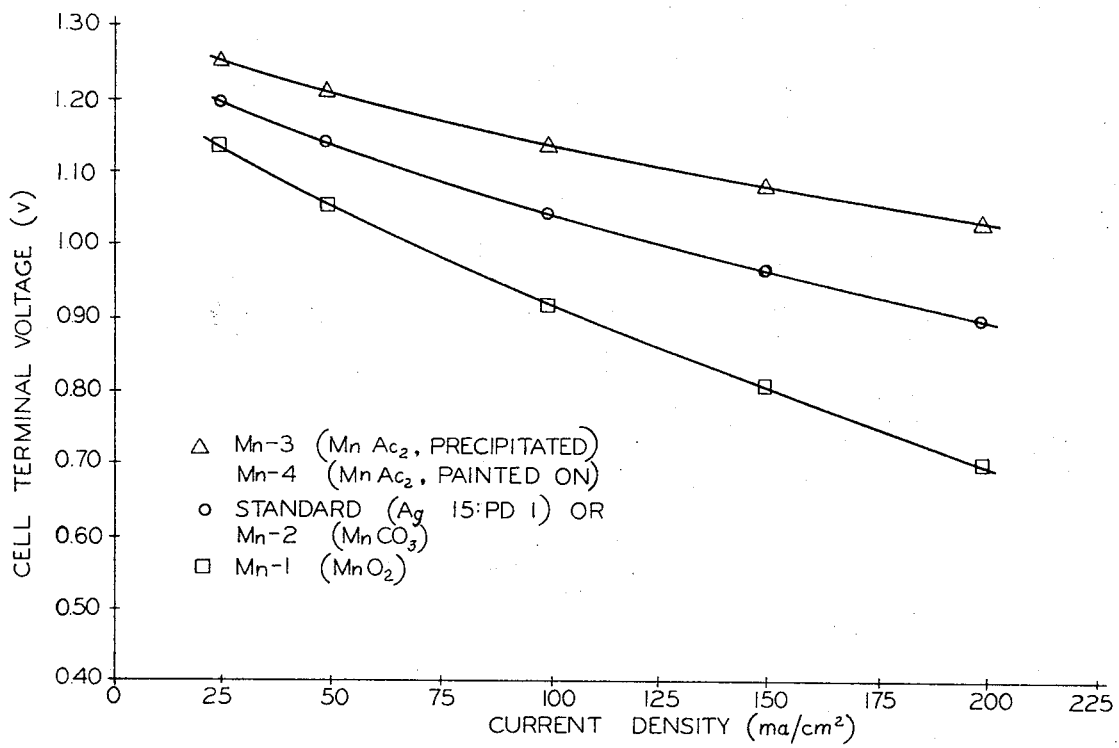
FIG. 1 is a plot of the performance of electrodes made according to this invention as compared to electrodes made using other techniques.

This invention relates to the preparation of hydrophobic type cathodes with an ultrafine manganese oxide catalyst formed in situ among the active materials comprising the active layer. More particularly, this invention comprehends precipitating ultra-fine (i.e., less than 0.2 microns)

manganese oxide by adding an alcohol-solvated manganous carboxylate to the active materials in the presence of oxygen and a weak alkalizer. As indicated above, the cathode's active layer is a sintered mass of materials comprising conductive particles (e.g., carbon or graphite) admixed with hydrophobic particles (e.g., Teflon) in which the hydrophobic particles can vary from about 5% to about 75% by weight of the carbon-Teflon mass. In a preferred embodiment, the active layer comprises a 1:1 weight ratio of carbon or graphite particles and Teflon particles. The manganese oxide (calculated as MnO) particles comprise at least about 10% (i.e. about 0.5 mg./cm.$^2$) by weight of the catalyzed active layer, with about 40% (i.e., about 2 mg./cm.$^2$) by weight being the practical upper concentration limit. In this regard, manganese oxide concentrations of up to as much as 60% (i.e., about 3 mg./cm.$^2$), by weight, have been tested but show no substantial improvement in cathode performance over the aforesaid 40% practical upper limit. Loadings of about 30% to 40% of the carbon-wetproofant-catalyst materials are preferred. The manganese oxide catalyst of this invention is actually a mixture of various oxides of manganese in which the Mn exists principally in at least the Mn$^{+++}$ state, and the term manganese oxide is used herein to mean that mixture. At least 80% of the particles in the mixture are less than 0.2 micron and, in the all-alcohol embodiment, mostly less than 0.1 micron.

In one embodiment of the invention, the ultrafine size of the manganese oxide particles and their distribution substantially corresponds to that of manganic oxide particles formed as a result of the direct oxidation of the manganese oxide catalyst is derived. In another embodiment, the ultrafine size of the manganese oxide particles and their distribution appears related to finely precipitated manganous hydroxide which has been subsequently oxidized to manganic oxide. Formation of manganic oxide from an alcohol-solvated manganous carboxylate (i.e. acetate) in the presence of a mild alkalizer and oxygen provides the aforesaid ultrafine parent particles from which the catalyst is derived. The manganic oxide thusly formed is probably in the hydrated form, $Mn_2O_2(OH)_2$.

In the first embodiment the manganic oxide is apparently directly formed without the intermediate formation of manganous hydroxide. In this embodiment, alcohol-solvated manganous carboxylate is mixed with the electrode's active materials in the presence of oxygen and a very weak base having a very low dissociation constant ($K_b$) in water, i.e. no greater than about $1 \times 10^{-3}$. Bases or alkalizers having dissociation constants ($K_b$) of less than about $1 \times 10^{-9}$ are useful but not necessary. The first embodiment includes virtually an all alcohol solvent reaction environment and the very weak base may be mixed directly with the alcohol-solvated manganous carboxylate before mixing with the active materials or it may be mixed with the active materials before adding the manganous carboxylate to them. The base-carboxylate-alcohol solution is stable in the absence of oxygen and manganous hydroxide will not precipitate out. Exposure of the solution to oxygen (e.g. air) at the time it is mixed with the active materials causes direct oxidation of the manganous ion to the manganic form. The base-carboxylate-alcohol solution is most conveniently brushed or sprayed onto an otherwise already dried and pressed layer of active materials and absorbed into the pores thereof. This substantially increases the surface area of exposure to oxygen and speeds oxidation of the carboxylate. The slight alkalinity insures that the oxidation reaction preempts any precipitation of manganous hydroxide which would otherwise occur if the alkalinity were too high. An alkaline environment is necessary to precipitate both manganic oxide and manganous hydroxide. Without being bound by any theory it is theorized that the low alkalinity favors direct formation of ultrafine manganic oxide while high alkalinity favors formation of large particle manganous hydroxide.

The solubility product of manganic oxide is substantially less than that of manganous hydroxide. Accordingly in this first embodiment the manganic oxide apparently precipitates immediately upon formation in the slightly alkaline environment which keeps the manganous ion in solution. In this regard, manganous hydroxide precipitates in aqueous solutions as a comparatively large crystal when the pH of the solution exceeds about 9, and subsequent air oxidation of such a large crystal results in mixed oxides having large crystals similar in size to the parent manganous hydroxide crystals from which they were derived. Such large crystal oxides are not acceptable for use as effective catalysts in high current density oxgyen depolarized cathode applications.

In a second embodiment of this invention, the alcohol-solvated manganous carboxylate is mixed with the active materials in the presence of oxygen after the active materials have been first blended or stirred into a weakly alkaline, alcohol-water solution. For purposes of this embodiment, a high speed blender of the Waring type is used. The active materials (e.g., carbon and Teflon) are suspended in the alkaline alcohol-water solution by the rapid stirring action of the blender's impeller and the alcohol-solvated manganous carboxylate solution slowly poured into the vortex of the stirred solution. In this embodiment, isopropanol-solvated ammonium hydroxide is the preferred alkalizer here. When pure alcohol is used here the reaction mechanism appears to be the same as involved in the first embodiment (i.e. no intermediate hydroxide). However, water may be added to the alcohol-solvated ammonium hydroxide to conserve on alcohol where more liquid volume is desired, but when it is, some precipitation of manganous hydroxide is likely to occur. The manganous hydroxide which apparently forms in the presence of the water has very small crystals and is very short lived since it is immediately oxidized to manganic oxide before any substantial hydroxide crystal growth can occur. The alcohol retards dissociation of the ammonium hydroxide and slows the crystal growth rate. Accordingly even with water, this retarded crystal growth rate combined with the shearing action on the crystal caused by the rapid stirring still produces manganese oxide particles the substantial bulk of which are less than about 0.2 micron in diameter. In this embodiment ammonium hydroxide is preferred to other alkalizers since it provides the added benefit of acting as a dispersing or anti-agglomerating, agent for the active materials in the blender.

In the first embodiment effective alkalizers are those having dissociation constants ($K_b$) in water of no greater than about $1 \times 10^{-3}$. Alkalizers having dissociation constants less than about $1 \times 10^{-9}$ are not necessary since those in the range $1 \times 10^{-3}$ to $1 \times 10^{-9}$ permit the direct oxidation of the manganese carboxylate to manganic oxide without the apparent intermediate formation of manganous hydroxide. Among the alkalizers suitable for this invention then are such bases as ethanolamine, ethylenediamine, pyridine, piperidine, triethylamine, benzylamine, ammonium hydroxide and the like. Solvents for the manganous carboxylates include principally the mono-, di- and tri-hydroxy alcohols having no more than three carbon atoms. This then includes such solvents as methyl, ethyl and propyl alcohol, ethylene and propylene glycol and glycerol. The principal criteria for selection of solvent is that there be sufficient solubility of the particular manganous carboxylate in it to permit catalyzing the active materials in a single operation rather than with repeated applications of a more dilute solution. In this regard, I prefer to use methanol-solvated manganous acetate. The alcohol suppresses dissociation of the alkalizer and hence provides a less sensitive environment for insuring that the alkalinity remains low during the oxidation reaction. Moreover the alcohol insures that the solution readily wets the hydrophobic-particle-containing active materials. Still further during drying the alcohols are completely removed at low temperatures without detriment to the active materials Lastly the use of non-metal containing alkalizers assures complete removal of any residual alkalizer after heating.

While manganous acetate is preferred because of its solubility and ready availability, a number of manganous carboxylates are considered acceptable for this application depending only on their solubility in the particular alcohol chosen. Carboxylates useful with this invention are those having the formula $Mn[H(CH_2)_nCOO]_2$ in which $n$ is an integer from 0 to 5 and hence are derived from any of the mono-acidic acids much as formic, acetic, propionic, butyric and valeric acid. The concentration of the manganous carboxylate in the alcohol is limited only by practical considerations. In this regard, the alcohol solution containing the dissolved manganous carboxylate should neither be so dilute as to require unnecessary volumes of solution to obtain the desired catalyst loading nor so concentrated that its viscosity inhibits good mixing with the active materials. In this latter regard, saturated solutions of the manganous carboxylates are very syrupy and will penetrate the electrodes, when using the brush-on technique, or react completely at the liquid-liquid-air interface in the blender-addition technique. Accordingly, I prefer to use solutions in which the manganous ion concentration varies from about 0.5 moles per liter to about 2 moles per liter.

As indicated above the catalyst may be dispersed among the active materials in at least two ways. In the one case, the slightly alkaline alcohol-solvated manganous carboxylate solution is brushed onto and absorbed into a dried and pressed layer of active materials. As the solution spreads throughout the active layer, its surface is greatly extended for maximum air exposure. In the other case, the alcohol-solvated manganous carboxylate solution is slowly added in air to the active materials (i.e., carbon-Teflon) while they are stirred in suspension in an alkaline alcohol solution, with or without water. The latter technique is preferred since it insures that the manganese oxide is uniformly dispersed among the active materials which in turn contributes to increased electrode life. In either case, after oxidation is complete, the active materials and solution are heated to drive off the solvent, remove any non-manganese oxide residue and dry the particles.

Experimental

A number of cathode sheets were prepared by depositing active layer materials onto a layer of Teflon. The active layer materials comprised carbon black (i.e. Conductex) and Teflon 3170, or colloidal graphite (i.e. G.P. W.) and Teflon 3170 in a 1:1 ratio of particles. Teflon 3170 is an aqueous colloidal suspension of submicron Teflon particles containing about 60% solids. The catalysts were applied to the active materials either by (1) adding methanol-solvated manganous acetate to blender suspensions of the active materials prior to depositing the active layer on the Teflon layer or (2) by brushing an ethanolamine-alkalized, methanol-solvated manganous acetate solution onto the active layer after it was deposited onto the Teflon layer.

More specifically, the test electrodes were prepared as follows:

(A) A standard suspension of isopropanol/water/ammonium hydroxide and the selected 1:1 carbon or graphite-Teflon 3170 admixture was prepared. This is rapidly stirred in a Waring blender for at least about 5 minutes to disperse the carbon and Teflon. For some tests the manganese oxides were formed directly in this mix by slowly adding a methanol solution of manganous acetate to the whirling suspension (see columns b and d of Table I). For other tests, only the carbon-Teflon materials were prepared at this step (see columns a to c of Table I).

(B) A standard Teflon sheet (584 cm.$^2$) was mounted on a vacuum table.

(C) 100 ml. of isopropanol was added to 100 ml. of the standard suspension from (A) above and poured onto the Teflon sheet.

(D) The sheet was dried at 150° C. for 15 minutes.

(E) The dry cathode sheet was pressed at 140 kg./cm.$^2$ using Dutch weave cloth on the Teflon side and a thin polyethylene sheet on the active layer side. If the manganese oxide had not already been formed in the blender, the solution shown in Table II was painted or sprayed onto the active layer at this time.

(F) After drying, the cathode sheet was heated in an oven at 288° C. for 5 minutes to form and bond the carbon-Teflon oxide layer to the porous Teflon sheet.

(G) The completed cathode sheet was pressed at 140 kg./cm.$^2$ to 3-mm. thick onto a porous nickel conductor and contained a carbon-Teflon or graphite-Teflon active layer loading of 6.85 mg./cm.$^2$.

A number of the electrodes had their active layers catalyzed at step E with a standard silver-palladium catalyst (Ag: 15–Pd: 1). These electrodes were used as the base line for comparing all of the manganous acetate treated electrodes. The catalyst loadings on all the electrodes were 1.40 mg./cm.$^2$. Tests of these electrodes were conducted against a conventional pasted zinc anode and FIG. 1 shows the results. In FIG. 1, Mn–1 designates a cathode in which MnO$_2$ powder was added to the carbon-Teflon suspension;

Mn–2 designates a cathode in which MnCO$_3$ powder was added to the carbon-Teflon suspension;

Mn–3 designates a cathode in which MnAc$_2$·4H$_2$O was dissolved in methanol and added to the carbon-Teflon suspension;

Mn–4 designates a cathode in which MnAc$_2$·4H$_2$O was dissolved in methanol and painted onto the cathode sheet after the active layer was formed. (Table II solution.)

Colloidal graphite and Teflon 3170 cathodes were also evaluated at a fixed graphite-Teflon loading of 6.85 mg./cm.$^2$ with the manganese oxide catalysts applied to the active layers in exactly the same manner as for Mn–3 and Mn–4. These cathodes are designated G-Mn–1 and G-Mn–2 in FIG. 2.

Figure 2:
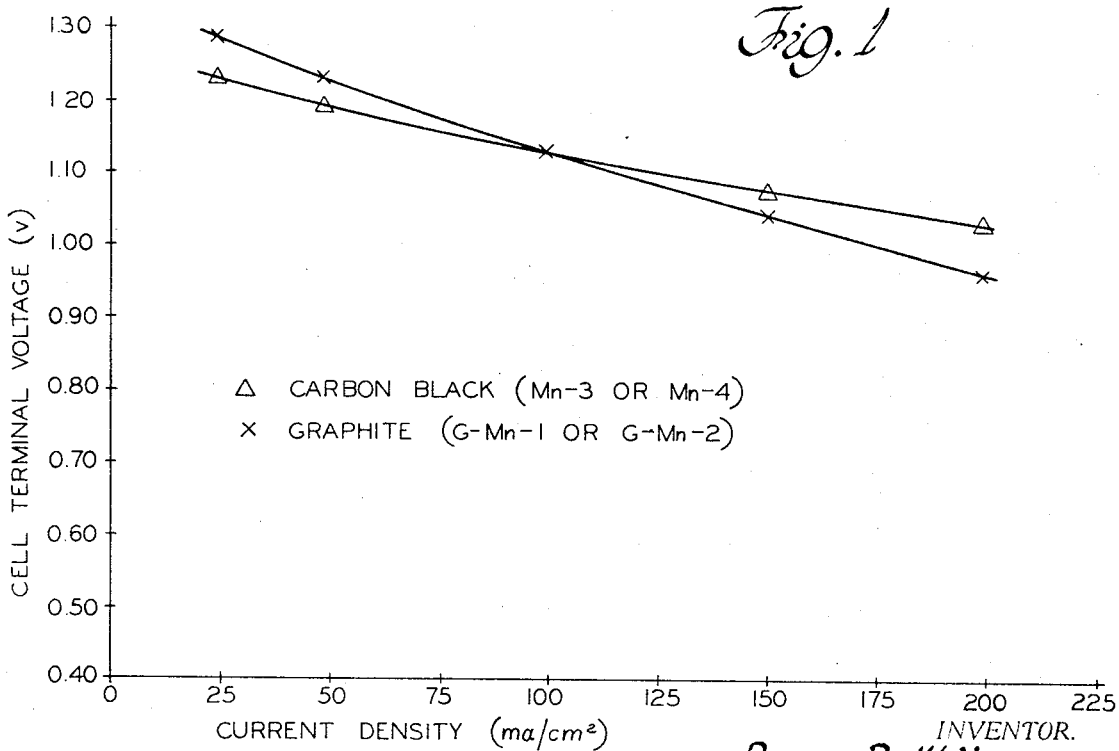
FIG. 2 is a plot of the performance of carbon black based electrodes versus graphite based electrodes catalyzed in accordance with this invention.

Cathodes with an overall area of 67.2 cm.$^2$ were cut from the large R 584 cm.$^2$ sheets and mounted in electrode holders to produce a usable electrode area of 48 cm.$^2$. These electrodes were tested and cathode activity was measured in terms of the terminal voltage of a complete zinc-air cell under conditions of increasing current density up to a maximum of 200 ma./cm.$^2$. In all of these tests, the electrolyte used was 33% KOH, and the zinc anodes were of the pasted type. Anodes were pressed against the cathodes with a plastic spacer or separator strip so that the electrolyte space depended only on the separator thickness. In each case, an immediate current-voltage curve was plotted under conditions of increasing current density, and the remainder of the cell capacity was then discharged at 200 ma./cm.$^2$ to permit break-in of the cathodes. A maximum of four anodes was sometimes necessary, to reach steady state performance. Only the steady-state values are shown in FIGS. 1 and 2.

It can be seen from FIG. 1 (Mn–1) that cell performance with an MnO$_2$ powder addition is well below that of the standard Ag:Pd catalyst containing electrodes. At 200 ma./cm., the voltage of the cell containing the MnO$_2$ powders was 0.20 v. lower than the Ag:Pd standard. This lower performance (curve ☐) is most likely related to the relatively large particles of MnO$_2$. Although the manganese dioxide powders would pass through a 325-mesh screen (45 microns), they were still many times the diameter of the submicron Teflon and carbon black particles in the active layer. With the larger particles of manganese dioxide, effective decomposition and utilization of the peroxide produced in the cathode reaction is not possible.

A much finer manganous oxide (MnO) was derived from the thermal decomposition of manganous carbonate (Mn-2) and produced better results. The catalyst resulting from this process contains many micron-sized particles which can promote more effective decomposition and use of the peroxide formed in the electrode reaction. It can be seen that the cell containing this catalyst has a current-voltage curve (curve O) identical with the cell containing a cathode with the Ag:Pd catalyst system (superimposed curves).

The most active manganese oxide catalysts prepared were made in accordance with this invention. In one case (Mn-3), this was accomplished by formation of the manganese oxide from alcohol-solvated manganous acetate poured into the alcohol-ammonium hydroxide, carbon-Teflon suspension. In another case (Mn-4), it was done by painting ethanolamine alkalized, alcohol-solvated manganous acetate onto the active layer before the final high temperature heat treatment. It can be seen from FIG. 1 (curve Δ) that the cells containing either one of these catalysts are superior to the standard Ag:Pd catalyst-containing control cell at all current densities tested. At 200 ma./cm., the Mn-3 and Mn-4 catalyst-containing cells were about 0.10 v. higher than the control cell. This improved cell voltage is due to the ultrafine submicron particle size of manganese oxide catalysts formed according to this invention.

The electrochemical behavior of graphite-Teflon cathodes catalyzed in accordance with this invention is shown in FIG. 2 for the G-Mn-1 and G-Mn-2 treatments. In FIG. 2, these electrodes are compared to the best managanese oxide catalyzed carbon-black-Teflon cathodes from FIG. 1 (Mn-3 and Mn-4). At current densities below 100 ma./cm.$^2$, the graphite based cathode cells are slightly better than the carbon black based cathode cells. At 25 ma./cm.$^2$, the G-Mn-1 and G-Mn-2 are 0.05 v. higher than Mn-3 or Mn-4 cells. On the other hand, at 200 ma./cm.$^2$, the graphite based cells are about 0.06 v. less than the carbon based cells.

TABLE I.—STANDARD SUSPENSIONS USED IN PREPARING ELECTRODES

|  | (a) Carbon balck only | (b) Carbon black plus MnAc₂ | (c) Graphite only | (d) Graphite plus MnAc₂ |
|---|---|---|---|---|
| Isopropanol, ml | 300 | 250 | 300 | 250 |
| Water, ml | 120 | 120 | 85 | 85 |
| NH₄OH, ml | 30 | 30 | 30 | 30 |
| Teflon 3170, ml | 12.5 | 12.5 | 12.5 | 12.5 |
| Carbon black or graphite, g | 10 | 10 | ¹ 45 | ¹ 45 |
| Methanol, ml |  | 50 |  | 50 |
| MnAc₂·4H₂O, g |  | 13.4 |  | 13.4 |

¹ 22% solids in H₂O.

TABLE II

Manganese acetate catalyzing solution (50 mg./ml. MnO equivalent)

MnAc₂·4H₂O _____g__ 33.4
Methanol _____ml__ 200
Ethanolamine (mono) _____ml__ 10

While this invention has been disclosed primarily in terms of specific embodiments thereof, it is not intended that it be limited thereto but rather only to the extent hereinafter set forth in the appended claims and in which the word carbon is used generically to include graphite and the like.

I claim:
1. In the method of preparing alkaline-electrolyte, hydrophobic type, oxygen-depolarized cathodes having a support and an active layer blend of conductive particles and wetproofant on the support, the improvement comprising rendering the blend catalytically active by:
preparing a solution consisting essentially of at least one solvent selected from the group consisting of the mono-, di- and tri-hydroxy alcohols having no more than three carbon atoms and a manganous carboxylate of the formula

$$Mn[H(CH_2)_nCOO]_2$$

wherein $n$ is an integer from 0 to 5.
adding said solution to said blend in the presence of a weak, non-metal-containing alkalizer and oxygen to form a dispersion of manganese oxide throughout said solution and said blend, said alkalizer having a dissociation constant ($K_b$) in aqueous solution of no more than about $1 \times 10^{-3}$ and no less than about $1 \times 10^{-9}$ and said manganese oxide dispersion consisting essentially of particles less than about 0.2 microns in diameter;
heating the blend and oxide mixture to dry it and remove any non-manganese oxide reaction products or residues; and heating the dried mixture to a temperature sufficient to bond the mixture to the support.

2. The method as set forth in claim 1 wherein said alkalizer is ethanolamine and it is added to said solution prior to adding said solution to said blend.

3. The method as set forth in claim 1 wherein said blend is suspended by rapid stirring in an alcohol-solvated ammonium hydroxide suspension medium and said solution is slowly added to said medium during said stirring.

4. In the method of preparing alkaline-electrolyte, hydrophobic type, oxygen-depolarized cathodes having a support and an active layer blend of conductive particles and wetproofant on the support, the improvement comprising rendering said blend catalytically active by:
impregnating the blend with a solution consisting essentially of (1) an alkalizer having a dissociation constant ($K_b$) in aqueous solution of no more than about $1 \times 10^{-3}$ and no less than about $1 \times 10^{-9}$, (2) a solvent selected from the group consisting of the mono-, di-, and tri-hydroxy alcohols having no more than three carbon atoms and (3) about 0.5 mole per liter to about 2.0 moles per liter of a manganous carboxylate of the formula $$M_n[H(CH_2)_nCOO]_2$$

wherein $n$ is an integer from 0 to 5;
oxygenating the solution to form a manganese oxide dispersion throughout said blend and consisting essentially of less than 0.2 micron size oxide particles;
heating said blend and oxide mixture to dry it and to remove any non-manganese oxide reaction products or residues; and heating the dried mixtures to a temperature sufficient to bond the mixture to the support.

5. In the method of preparing alkaline-electrolyte, hydrophobic type, oxygen-depolarized cathodes having a support and an active layer blend of conductive particles and wetproofant on the support, the improvement comprising rendering said blend catalytically active by:
rapidly stirring and suspending a blend of carbon particles and wet proofing particles into a first solution consisting essentially of ammonium hydroxide and at least one solvent selected from the group consisting of mono-, di-, and tri-hydroxy alcohols having no more than three carbon atoms;
preparing a second solution consisting essentially of a solvent selected from the group consisting of mono-, di-, and tri-hydroxy alcohols having no more than three carbon atoms and about 0.5 to about 2.0 moles per liter of manganous carboxylate having a formula $$Mn[H(CH_2)_nCOO]_2$$

wherein $n$ is an integer from 0 to 5;
in the presence of oxygen, slowly adding said second solution to said stirring first solution to form a manganese oxide dispersion throughout said blend and consisting essentially of less than 0.2 micron size oxide particles;

depositing the blend and oxide mixture on said support;

heating the blend and oxide mixture to dry it and to remove any non-manganese oxide reaction products or residues; and heating the dried mixture to a temperature sufficient to bond the mixture to the support.

6. The method as claimed in claim 5 wherein said solvent for said first solution is isopropanol, said solvent for said second solution is methanol and said manganous carboxylate is manganous acetate.

7. In the method of preparing alkaline-electrolyte, hydrophobic type, oxygen-depolarized cathodes having a support and an active layer blend of carbon and wet-proofant particles on the support, the improvement comprising rendering said blend catalytically active by:

impregnating the blend with a solution consisting essentially of about 0.5 mole per liter to about 2.0 moles per liter of manganous acetate, methanol and ethanolamine;

oxygenating the solution to form a manganese oxide dispersion throughout said blend and consisting essentially of less than 0.2 micron size particles;

heating said blend and oxide mixture to dry it and to remove any non-manganese oxide reaction products or residues; and heating the dried mixture to a temperature sufficient to bond the mixture to the support.

References Cited

UNITED STATES PATENTS

| 3,649,361 | 3/1972 | Paynter et al. | 136—86 D |
| 3,414,440 | 12/1968 | Moore | 136—122 X |

FOREIGN PATENTS

| 311,272 | 1/1930 | Great Britain | 136—139 |

L. DEWAYNE RUTLEDGE, Primary Examiner

M. J. ANDREWS, Assistant Examiner

PO-1050
(5/69)

UNITED STATES PATENT OFFICE
CERTIFICATE OF CORRECTION

Patent No. 3,748,184   Dated July 24, 1973

Inventor(s) Romeo R. Witherspoon

It is certified that error appears in the above-identified patent and that said Letters Patent are hereby corrected as shown below:

Column 3, line 32, before "manganese" insert -- manganous carboxylate and from which the --. Column 5, line 1, after "materials" insert a period (.); line 21, after "will" insert -- not --. Column 6, line 43, "67.2" should read -- 67.7 --; line 64, "200 ma./cm." should read -- 200 ma./cm.$^2$ --. Column 7, line 21, "ma./cm." should read -- ma./cm.$^2$ --; Table I, (a) "Carbon balck only" should read -- Carbon black only --. Column 8, line 42, "$M_2[H(CH_2)_nCOO])_2$" should read -- $M_n[H(CH_2)_nCOO]_2$ --.

Signed and sealed this 25th day of December 1973.

(SEAL)
Attest:

EDWARD M. FLETCHER, JR.   RENE D. TEGTMEYER
Attesting Officer   Acting Commissioner of Patents